C. F. MOTZ.
GRINDING MACHINE.
APPLICATION FILED OCT. 1, 1917.
1,361,085.
Patented Dec. 7, 1920.
2 SHEETS—SHEET 1.
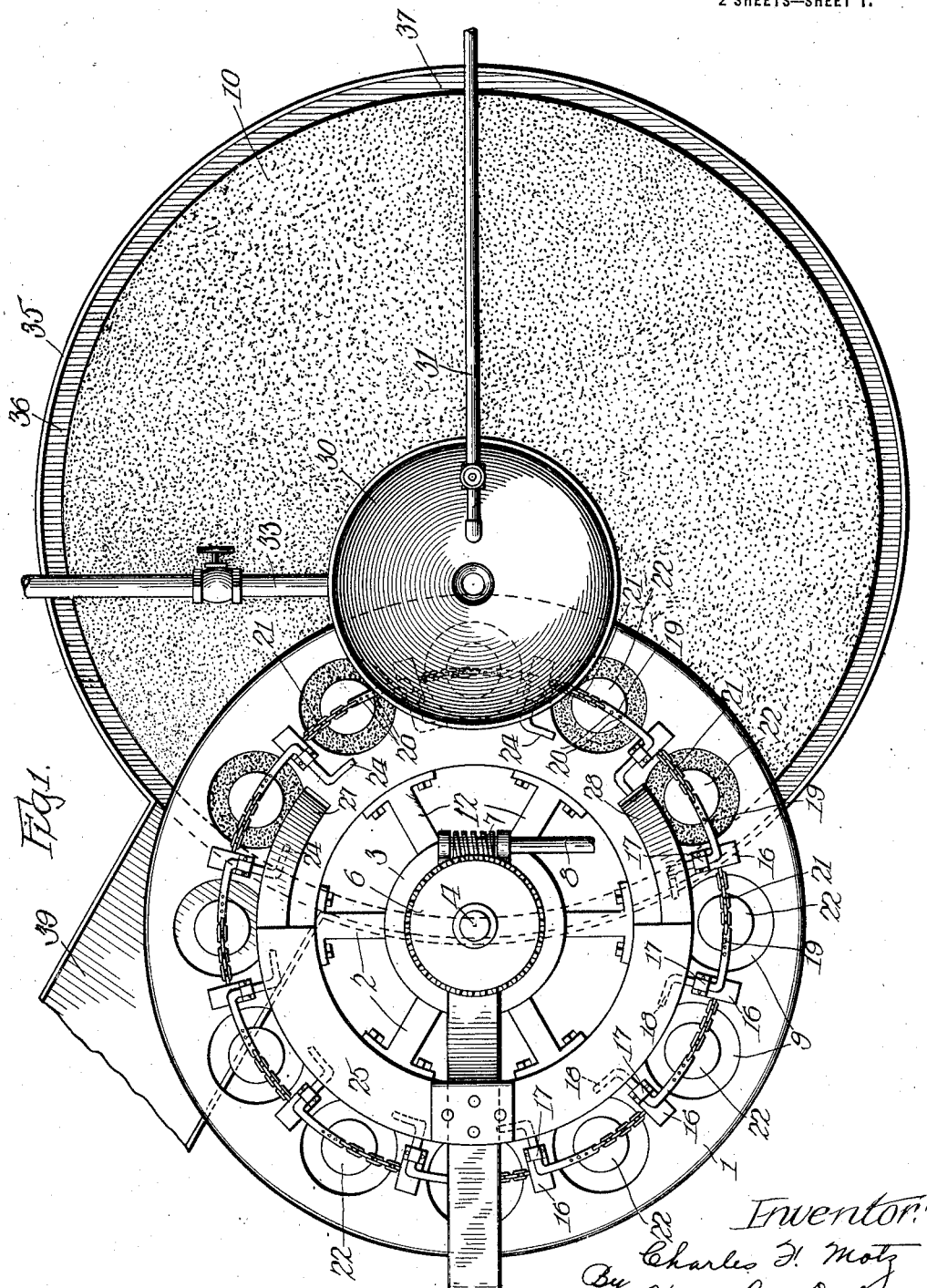

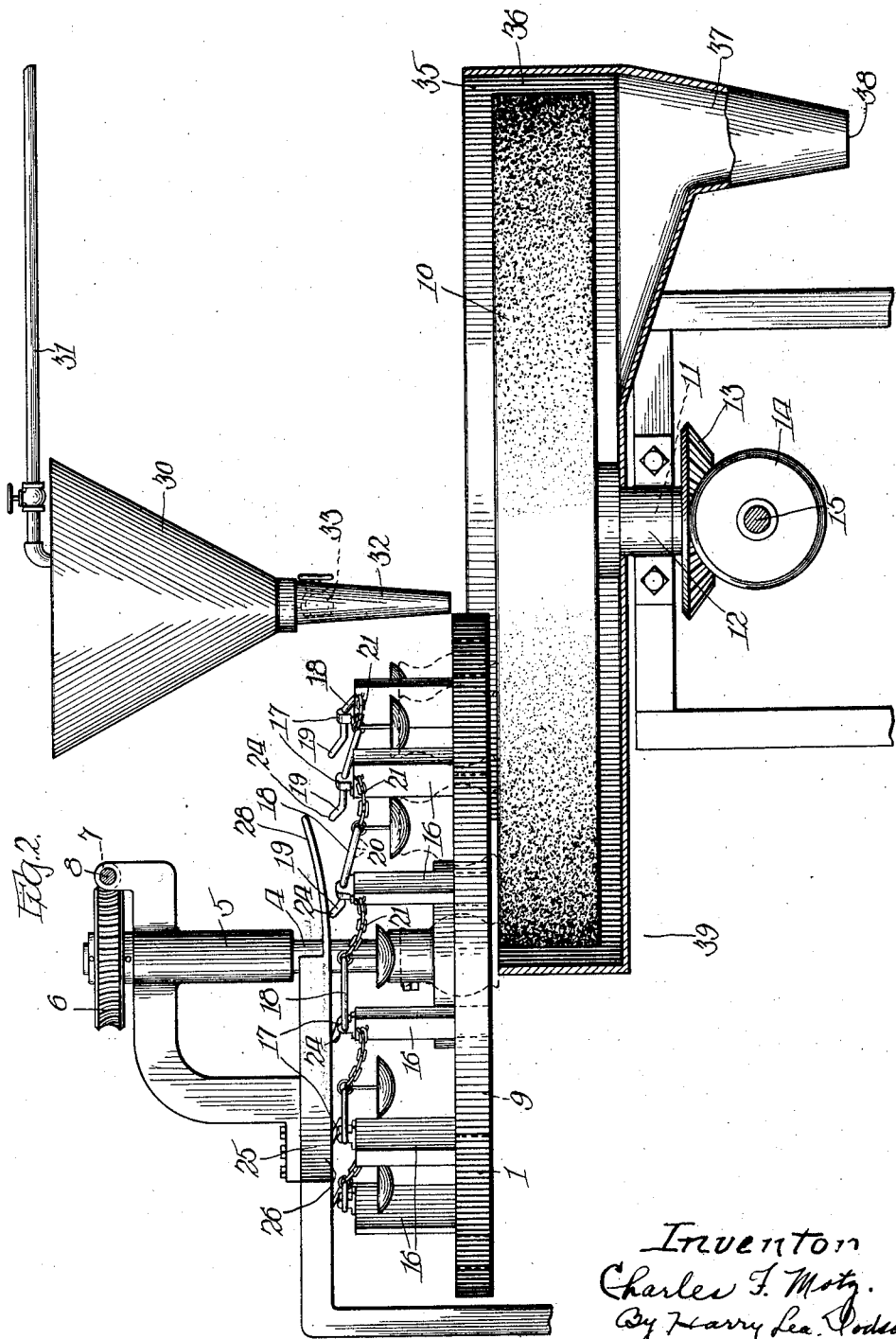

UNITED STATES PATENT OFFICE.

CHARLES F. MOTZ, OF MONACA, PENNSYLVANIA.

GRINDING-MACHINE.

1,361,085. Specification of Letters Patent. Patented Dec. 7, 1920.

Application filed October 1, 1917. Serial No. 194,147.

*To all whom it may concern:*

Be it known that I, CHARLES F. MOTZ, a citizen of the United States, residing at Monaca, in the county of Beaver and State of Pennsylvania, have invented a certain new and useful Improvement in Grinding-Machines, of which the following is a specification.

My invention relates to that class of devices which are designed to grind the rough edges left by the maker of shades, globes, etc., and has for its object to provide a device which only requires to have the article to be ground delivered to it, and which will automatically and gradually apply the necessary pressure to cause the stone to grind, and to automatically remove the pressure and provide means to cause the machine to automatically deliver the articles to the packer.

My means of accomplishing the foregoing objects may be more readily understood by having reference to the accompanying drawings, which are hereunto annexed and are a part of this specification, in which:

Figure 1 is a plan view of my invention.

Fig. 2 is a side elevation of the same.

As shown in the drawings, the machine comprises an annular holder 1, which is carried by a plurality of arms 2, which extend radially from a plate 3, being bolted thereto, or secured in any suitable manner. This plate 3, is fixedly secured to the end of a vertical shaft 4, which is carried in suitable bearings 5, and has at its upper end a worm gear 6, which is in mesh with a worm 7, secured to a shaft 8, which may be driven by any suitable power (not shown).

The holder 1, is provided with a plurality of holes 9, which are preferably of greater diameter than the articles to be ground. The holder is suspended adjacent the upper surface of a grinding stone 10, which is placed in a horizontal plane and is rotated by means of a shaft 11, mounted in suitable bearings 12, the end of the shaft being provided with a bevel gear 13, driven by a pinion 14, carried by a shaft 15, which may be driven by any suitable power (not shown). As shown, about one half of the annular holder 1, extends across the surface of the stone 10, the portion of the holder 1, above the stone 10, moving in an opposite direction to the movement of the stone 10.

Intermediate the holes are placed a plurality of supports 16, and on the top of each one of them is mounted in suitable bearings 17, a crank, which has two arms 18 and 19, at 180 degrees. The arm 19, extends over the adjacent hole, and is concentric therewith. This arm is provided with a number of holes 20, to one of which is secured a chain 21, from which is suspended a hemispherical weight 22, the flat part of which is uppermost. A chain 23, is secured to the arm 18, and to the next support to prevent the weight dropping too far. The end 24, of the arm 18, is preferably beveled or rounded, the purpose of which will be hereinafter explained.

Just above that portion of the holder 1, which does not extend over the stone 10, is fixedly mounted a semi-circular member 25, the lower part of which is provided with a metal track 26, one end 27, of which, is adapted to engage the arms 18, during the travel of the holder 1. The other end 28, is inclined upwardly as at 29. A conoidal hopper 30, containing sand or any suitable cutting medium is located above the stone, and a pipe 31 is provided to wet the sand. A spout 32, extends from the opening, in the bottom of the hopper to lead the sand to the desired position on the stone 10, but owing to the fact that it is dampened, it will not flow freely, and it is necessary therefore to provide an additional supply of water which is furnished through a pipe 33. This water serves the double purpose of washing the sand from the trough 32, onto the stone 10, and also wets the stone.

It will be obvious that as the stone 10, is rotated, the water and sand will be thrown to its periphery. I care for this by mounting a wall 35, of sheet metal around the stone, but adjacent its periphery and extending slightly above the plane of the stone, thus leaving a small space 36, intermediate the periphery of the stone 10, and the wall 35. This leads downwardly into a trough 37, which carries the water and sand to a drain 38, which permits the water to flow away and saves the sand to be used over.

Just below the holder 1, and at the point where it leaves the stone 10, is located an inclined plane 39, which is adapted to receive the articles and conduct them from the machine to the packers.

The operation of the machine is as follows:

The power being turned on, the stone 10 and holder 1, are rotated in the direction indicated by the arrows, the stone, however, traveling at a higher rate of speed than the holder. The operator places one of the articles 40, which is to be ground in one of the holes 9, so that it rests on the stone. As the holder rotates the arm 18, which has been engaged by the track 26, and thus held, the arm 19 and consequently the weight 22, reaches the inclined portion 28, of the track 26, and the continued travel of the holder permits the weight to gradually lower until its convex portion is brought in contact with the opening in the top of the article 40, and owing to the shape, it finds its own center. While the chain 23, preventing its entire weight from falling on the article to be ground, as the holder continues its travel, another and another of the shades 40, or articles which are to be ground, are placed in the next succeeding hole, and the travel of the holder 1, is arranged to provide sufficient time for the article to be ground by the time the holder leaves the stone 10. At this point, the arm 18, is brought into enagement with the end 25 of the track 26, which operates to depress the arm 18, and correspondingly elevates the weight carrying arm 19, lifting the weight off of the shade 40. At this point, the shade reaches the inclined plane 39, and commences to slide down it and also to leave the hole 9. The next one pushes it farther, and so does the next until it is clear of the holder and reaches the hands of the packers, leaving the hole free to receive another shade at the opposite point, where the operator or feeder is stationed.

Although I have shown and described a specific embodiment of my invention, the drawings are furnished only for illustrative purposes, and I do not desire to be understood as limiting myself to the specific form and details, as shown and described.

Having described my invention what I regard as new and desire to secure by Letters Patent is:

1. The combination with a grinding stone, means to rotate said stone, an annular holder having a plurality of holes therein, a plurality of supports intermediate said holes, each of which has a crank mounted thereon, the arms of which are at 180 degrees, a weight secured to one of said arms, which is concentric to the adjacent hole the other arm being eccentric thereto, a track mounted above said supports and adapted to engage said arms and elevate the weight carrying arm at a predetermined point in the revolution of the holder, and to gradually lower the same at the desired time, means to rotate said holder.

2. The combination with a grinding stone, means to rotate said stone, an annular holder having a plurality of holes therein, a plurality of supports intermediate said holes, each of which has a crank mounted thereon, the arms of which are at 180 degrees, a weight swinging from one of said arms, said weights being hemispherical, the flat portion of which is uppermost.

3. The combination with a grinding stone, means to rotate said stone, an annular holder having a plurality of holes therein, a plurality of supports intermediate said holes, each of which has a crank mounted thereon, the arms of which are at 180 degrees, a weight secured to one of said arms, which is concentric to the adjacent hole the other arm being eccentric thereto, a track mounted above said supports and adapted to engage said arms and elevate the weight carrying arm at a predetermined point in the revolution of the holder, and to gradually lower the same at the desired time, means to rotate said holder, an inclined plane at the opposite side of the machine from which it is fed and below the holder which receives the ground articles and delivers them to the packers.

4. In combination, a traveling holder adapted to receive a plurality of articles to be ground, means to grind said articles, means actuated by the travel of the holder to permit gravity to apply self centering weights to said articles, and means to automatically receive the articles when ground and deliver them to the packers.

5. The combination with a grinding stone, means to rotate said stone, an annular holder having a plurality of holes therein, a plurality of supports intermediate said holes, each of which has a crank mounted thereon, the arms of which are at 180 degrees, a weight secured to one of said arms, a track mounted above said supports and adapted to engage said arms and elevate the weight carrying arm at a predetermined point in the revolution of the holder, and to gradually lower the same at the desired time, means to rotate said holder.

6. The combination with a grinding stone, means to rotate said stone, an annular holder having a plurality of holes therein, a plurality of supports intermediate said holes, each of which has a crank mounted thereon, the arms of which are at 180 degrees, a weight secured to one of said arms, a track mounted above said supports and adapted to engage said arms and elevate the weight carrying arm at a predetermined point in the revolution of the holder, and to gradually lower the same at the desired time, means to rotate said holder, and means to adjust the position of said weights.

7. The combination with a grinding stone, means to rotate said stone, an annular holder having a plurality of holes therein, a plurality of supports intermediate said holes, each of which has a crank mounted thereon, the arms of which are at 180 degrees, a weight secured to one of said arms, which is concentric to the adjacent hole the other arm being eccentric thereto, a track mounted above said supports and adapted to engage said arms and elevate the weight carrying arm at a predetermined point in the revolution of the holder and to gradually lower the same at the desired time, means to rotate said holder, and means to prevent the downward movement of said weights beyond a predetermined point.

In testimony whereof I have signed the foregoing specification.

CHARLES F. MOTZ.